United States Patent [19]

Powell et al.

[11] Patent Number: 4,832,131
[45] Date of Patent: May 23, 1989

[54] SPRINKLER HEAD CLEANING DEVICE

[76] Inventors: Jay W. Powell, 1718 Timbers; Louis M. Skelley, 830 Wyche, Both of Irving, Tex. 75061

[21] Appl. No.: 40,650
[22] Filed: Apr. 21, 1987
[51] Int. Cl.⁴ .................... A01B 45/00; A01D 34/84; A01D 34/68
[52] U.S. Cl. ........................................ 172/25; 172/41
[58] Field of Search ..................... 172/25, 41, 111, 13; 175/192, 88; 30/294

[56] References Cited

U.S. PATENT DOCUMENTS

| | | | |
|---|---|---|---|
| 1,857,383 | 5/1932 | Johnson | 172/25 X |
| 2,991,838 | 7/1961 | Lane | 172/111 |
| 3,143,176 | 8/1964 | Drane | 172/25 X |
| 3,444,934 | 5/1969 | Alberto | 172/25 |
| 3,554,293 | 1/1971 | Aman | 172/25 |
| 3,938,249 | 2/1976 | Chacon | 172/25 |

Primary Examiner—Richard J. Johnson
Attorney, Agent, or Firm—Fulbright & Jaworski

[57] ABSTRACT

A device for clearing debris from around an object such as a lawn sprinkler head. The device includes a cutting cylinder, a motor, means for coupling rotational output of the motor with the cutting cylinder, and a compression cylinder. A yieldable centering member may center the device axially of the object.

9 Claims, 2 Drawing Sheets

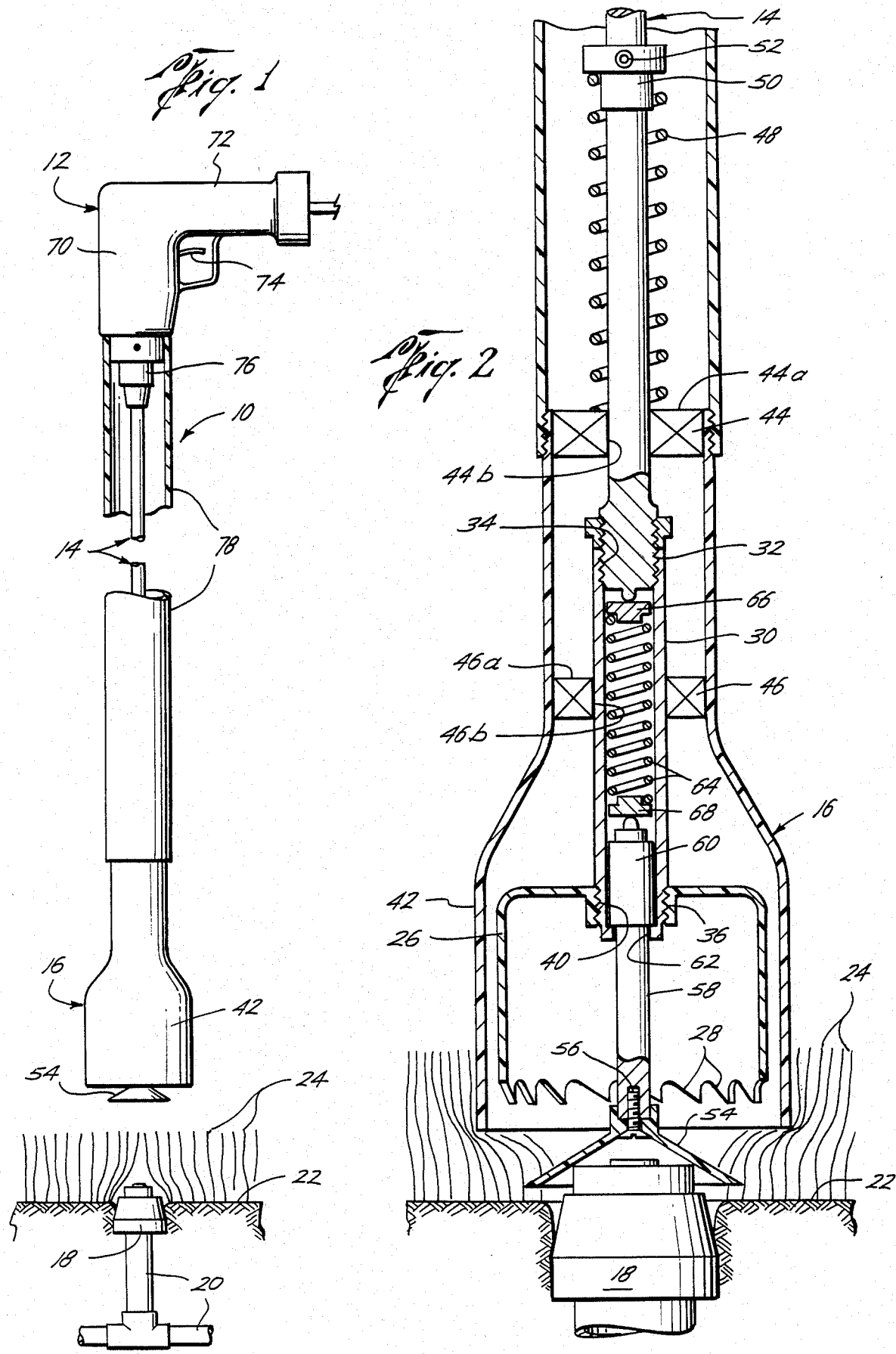

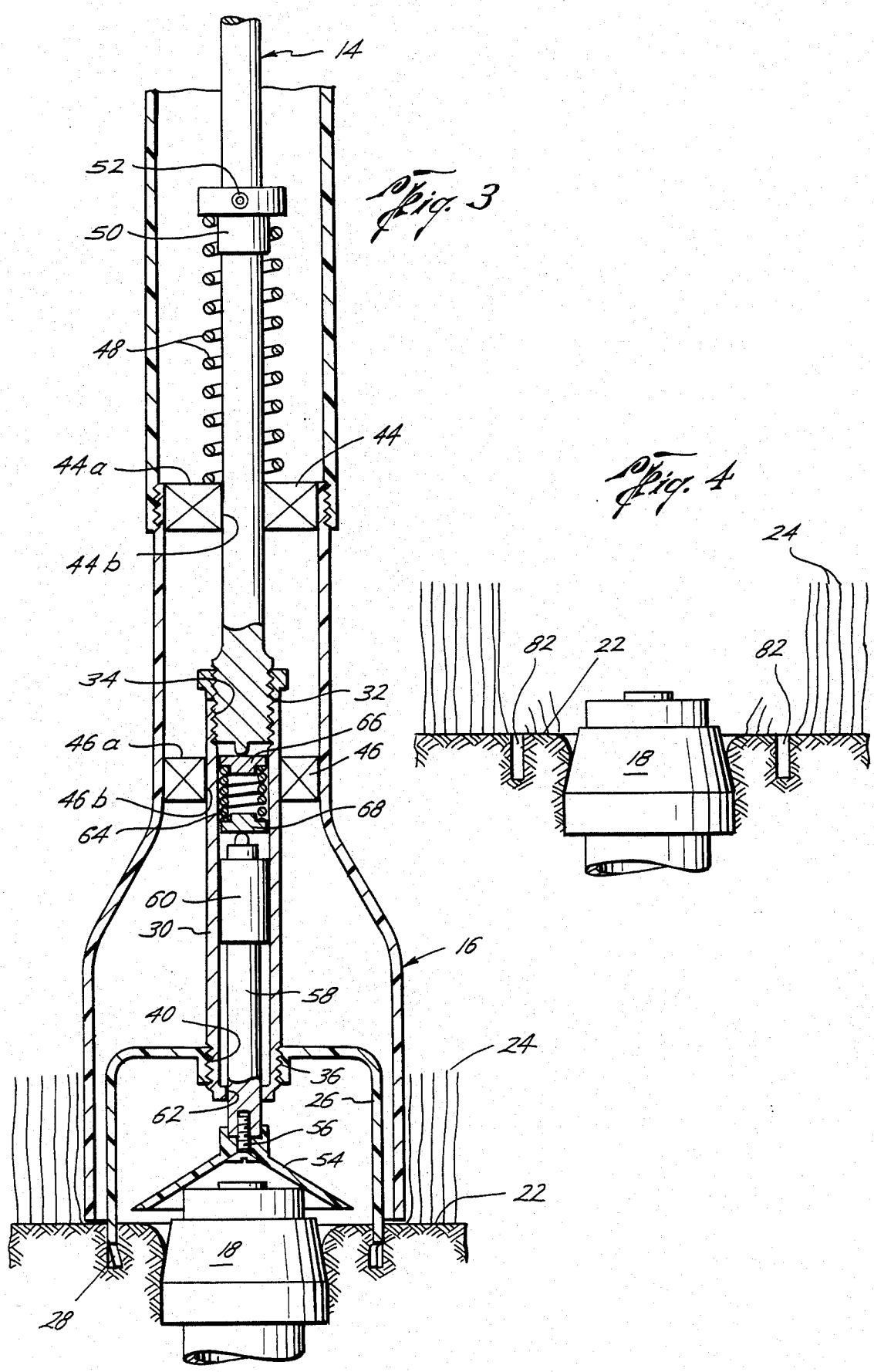

SPRINKLER HEAD CLEANING DEVICE

BACKGROUND OF THE INVENTION

This invention relates to a device for clearing debris from around an object. More particularly, the device is useful for clearing debris such as dirt, grass, weeds and other foreign matter around sprinkler heads and other similar objects embedded in the ground.

Sprinkler systems for watering lawns, gardens, golf fairways and numerous other forms of vegetation entail the use of sprinkler heads embedded in the earth, the uppermost portion of the head typically being mounted approximately flush with the ground so as to not interfere with mowing or other surface maintenance. Whether sprinkler heads are stationary or of the pop-up configuration, proper functioning is hindered by the growth of vegetation over the head, as well as the washing or drifting of dirt, rocks and other debris in deleterious fashion. Thus, continual maintenance to remove foreign matter from around sprinkler heads is essential to successful operation of a system.

Heretofore, rather laborious and generally ineffective methods of maintenance have been tried. Manual methods using sharp tools are not only slow but increase the likelihood of damage to a sprinkler head. The use of edgers or power trimmers likewise present a risk of damage to sprinkler heads and leave a great deal to be desired from the aesthetic standpoint.

BRIEF SUMMARY OF THE INVENTION

The present invention is directed to a mechanism for clearing around objects. The device is uniquely useful for clearing debris such as dirt, weeds, grass and the like from an object such as a sprinkler head, although the device is also useful for cleaning similar debris from valves or any other similar object embedded in the earth or other yieldable surface. The device comprises a generally cup-like cutting cylinder having serrations on its open extremity that will, upon rotation, exert a cutting action with respect to the debris. Although manually operated rotational means may be used, preferably a motor is coupled rotationally with the cutting cylinder. A compression cylinder is spaced concentrically about and rotationally free of the cutting cylinder so as to position the device against a surface surrounding the object, e.g., against the ground around a sprinkler head.

In a preferred embodiment, the motor is provided with a housing that forms a means for gripping and controlling the device, the rotational output of the motor being coupled to the cutting cylinder by means of a shaft of sufficient length such that an operator of the device may maintain a substantially erect position so as to avoid fatigue.

It is, therefore, an object of the present invention to provide a device for clearing around an object, particularly an object such as a sprinkler head in the ground.

Another object of the present invention is the provision of a device for clearing debris such as dirt, grass and the like from an object such as a sprinkler head wherein means are provided for engaging about and in spaced relation with the object, means mounted in concentric relation to the engaging means for rotational cutting movement, and means for imparting rotational movement to the cutting means.

Still another object of the present invention is the provision of such a device wherein a motor and shaft impart rotation to a cutting cylinder, and the device engages about an object such as a sprinkler head to clear debris therefrom. Means are provided for positioning the device against the surface surrounding the object as well as means for aligning the device relative to the object.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is a general elevation view, partly in cross-section, illustrating the overall configuration of a device according to the present invention and being shown in a position prepatory to exerting a cleaning or clearing action vis-a-vis a sprinkler head.

FIG. 2 is a partial elevation view in cross-section showing the cutting end of the device contacting a sprinkler head.

FIG. 3 is a similar view but showing the device with the cutting cylinder having penetrated the earth around a sprinkler head in cutting fashion.

FIG. 4 is an elevation view partly in cross-section illustrating a sprinkler head from about which grass and some dirt have been cleared by the device of the present invention.

DESCRIPTION OF THE PREFERRED EMBODIMENT

Referring now to the drawings, and particularly to FIG. 1, the device of the present invention is generally identified by means of the reference character 10. It includes a motor and gripping assembly portion 12, a shaft portion 14, and a cutting end 16. Also illustrated in FIG. 1 is a portion of a sprinkler system, including a sprinkler head 18 and piping 20 buried in the earth. The surface of the ground is represented by the reference character 22, grass 24 being shown as having overgrown the sprinkler head 18.

With reference to FIGS. 2 and 3, a generally cup-like cutting cylinder 26 has a plurality of serrations 28 on its open extremity which will, upon rotation, exert a cutting action with respect to the grass or other debris 22. The cutting cylinder 26 is mounted on the lower end of the shaft 14 so that rotational movement of the shaft 14 imparted by the motor 12 in turn rotates the cutting cylinder 26. In the embodiment illustrated in FIGS. 2 and 3, connection of the cutting cylinder 26 to the shaft 14 is effected by means of a tube 30 or other form of hollow shaft having threads 32 at one end for engaging similar threads 34 formed on the lower end of the solid portion of the shaft 14. The cutting cylinder 26 likewise is provided with threads 36 engaging similar threads 40 on the end of the hollow portion 30 of the shaft. Thus, the shaft 14 with its hollow portion 30 couples rotational output of the motor 12 with the cutting cylinder 26.

A compression cylinder 42 is spaced concentrically about the cutting cylinder 26 as illustrated in FIGS. 2 and 3. The compression cylinder 42 is mounted on the shaft 14 and extended hollow portion 30 thereof by means of suitable ball bearings, roller bearings or the like. While two bearing members 44 and 46 are shown in the drawings, it will be understood that any suitable number of bearing units may be used. The bearing units 44 and 46 thus permit the compression cylinder 42 to be rotationally free of the shaft 14. In addition, a compression spring 48 engages a spring stay member 50 bolted such as by means of a screw 52 to the shaft 14. Thus, one end of the spring 48 engages the stay 52 while the other end of the spring engages the surface 44a of the bearing member 44. The internal bearing surface 44b of the bearing 44 and the internal surface 46b of the bearing member 467 bear upon the outer surface of the shaft 14 or extensible portion 30 thereof and in axial sliding relationship therewith. Thus, the compression cylinder 42 has limited movement axially relative to the shaft 14, being yieldably biased downwardly and away from the shaft as viewed in FIGS. 2 and 3. As may be seen in FIG. 3, the ability of the compression cylinder 42 to slide axially (albeit limited) relative to the shaft 14 and extended portion 30 thereof combined with relative independent rotational freedom of movement provided by the bearing members 44 and 46 causes the compression cylinder 42 to engage the surface of the ground 22 and grass or other debris 24 in anchor fashion. The cutting cylinder 26, upon rotational movement, thus may penetrate the ground 22 and clear away the debris 24 from about the sprinkler head 18.

The cutting head 26 should be of a sufficient diameter that it will not strike the sprinkler head 18 during rotational operation. As now will be apparent to those skilled in the art, the broader the diameter the better from the standpoint of accommodating varied widths of sprinkler heads.

Further with respect to FIGS. 2 and 3, means are provided for aligning the device 10 in relation to the sprinkler head 18. Such means includes a concave centering member 54, the concavity thereof being engageable with the sprinkler head 18 in self-centering manner. The concave centering member 54 is mounted axially within the cutting cylinder 26 so as to have restricted relative axial movement and relative rotational freedom as between the centering member 54 and cutting cylinger 26. This is accomplish by affixing the concave member 54 such as by means of a screw 56 to a shaft 58 axially slidable within and substantially rotationally independent of the hollow portion 30 of the shaft 14. Preferably, a piston 60 is secured to the shaft 58 for axial alignment of the shaft 58 within the hollow portion 30 of the shaft 14. The piston 60 and internal bearing surface 62 of the hollow portion 30 of the shaft are of respective diameters so as to permit circumferential rotation of the shaft 58 and thus the concave centering member 54 relative to the shaft 14 and hollow portion 30 thereof.

A spring 64 positioned between an upper spring stay 66 and lower spring stay 68 yieldably biases the shaft 58 and thus the concave centering member 54 axially toward the sprinkler head 18. This biasing action promotes contact between the centering member 54 and the sprinkler head 18 so as to maintain positioning of the cutting cylinder 26 about the sprinkler head during the cutting operation.

Returning to FIG. 1, the motor portion 12 of the device may comprise either an electric motor or a gasoline engine. While manual crank or other manual rotational means may be used, a motor or engine is preferred for ease and effectiveness of operation. An electric motor is illustrated in FIG. 1 having a housing 70 with a manual grip 72 and trigger 74 to actuate the motor. A chuck 76 coupled with the shaft 14 to impart rotational movement of the motor to the cutting cylinder as previously explained. A shield 78 may be suitably mounted between the motor housing 70 and the compression cylinder 42 for both safety and aesthetic reasons. The shield 78 is desirable, for example, to prevent contact of the rotating shaft 14 by clothing, etc.

Ideally, the motor unit 12 may comprise a rechargeable electric portable drill which is light weight and enhances mobility of operation. However, any suitable power means may be employed.

While the presently preferred embodiment has been illustrated and described wherein the motor means 12 includes a housing 70 with a grip 72 to control operation of the device, it will be appreciated that other forms of motor drive means may be used, and the motor may be mounted in closer proximity to the cutting cylinder 26. In the latter event, it nevertheless will be desirable to have a throttle and any other control means mounted in proximity of the gripping portion 72.

In operation, the device 10 is gripped by means of the gripping portion 72 and is lowered over the sprinkler head 18 or other device to be cleaned as shown in FIG. 1. As shown in FIG. 2, a downward movement on the device 10 exerted by the operator causes the concave centering member 54 to engage the sprinkler head 18 for alignment and centering purposes. Still further downward force exerted by the operator on the device 10 causes the compression cylinder 14 to engage the surface of the ground 22 and anchor against grass 24 or other debris. The throttle trigger 74 is actuated to operate the motor and impart rotational force to the shaft 14 to in turn rotate the cutting cylinder 26. As shown in FIG. 3, the cutting cylinder 26 bores into the ground 22, cutting grass 24 and effectively clearing debris from about the sprinkler head 18 as shown in FIG. 4. Preferably a cut represented by reference character 82 in FIG. 4 is at least one and a half inches deep, leaving a smooth and clean cut edge around the sprinkler head thus permitting the sprinkler head to operate properly.

The present invention, therefore, is well adapted to carry out the objects and obtain the ends and advantages mentioned as well as others inherent therein. While presently preferred embodiments of the invention have been given for the purpose of disclosure, numerous changes in the details of construction and arrangement of parts may be made without departing from the spirit of the invention and the scope of the appended claims.

What is claimed is:

1. A device for clearing debris such as dirt, grass and the like from an object such as a sprinkler head, comprising,
   (a) a generally cup-like cutting cylinder having serrations on its open extremity which will upon rotation exert a cutting action with respect to the debris,
   (b) a motor,
   (c) means for coupling rotational output of the motor with the cutting cylinder,
   (d) a compression cylinder spaced concentrically about and rotationally free of the cutting cylinder so as to position the device against a surface surrounding the object, and
   (e) means for aligning the device in relation to the sprinkler head comprising,
      (1) a concave centering member, the concavity thereof being engageable with the sprinkler head in self-centering manner, and (2) means for mounting the concave centering member axially within the cutting cylinder with restricted relative axial movement therebetween.

2. The device of claim 1 wherein the concave centering member rotationally is substantially independent of the cutting cylinder.

3. The device of claim 1 including, spring means for yieldably biasing the concave centering member axially from the device toward the sprinkler head.

4. A device for clearing debris such as dirt and grass and the like from an earth-embedded object such as a sprinkler head, comprising
  (a) a generally cup-like cutting cylinder having serrations on its open extremity which upon rotation will exert a cutting action with respect to the debris, said cylinder being of sufficient diameter that it will not strike the sprinkler head during rotational operation,
  (b) a motor having a housing that provides a means for gripping the device,
  (c) a shaft, one end of which couples for rotation with the output of the motor and the other end of which couples with the cutting cylinder, and
  (d) a compression cylinder spaced concentrically about the cutting cylinder and mounted on the shaft for independent rotation relative to the shaft, said compression cylinder being axially slideable on the shaft so as to position the device against the earth surrounding the sprinkler head.

5. The device of claim 4 wherein the shaft is of sufficient length that an operator of the device gripping the motor housing may maintain a substantially erect position.

6. The device of claim 4 wherein the compression cylinder is mounted on the shaft with means yieldably biasing the compression cylinder axially away from the shaft and toward the earth.

7. The device of claim 4 including, additionally, means for aligning the device in relation to the sprinkler head.

8. The device of claim 7 wherein the alignment means comprises,
  (a) a concave centering member, the concavity thereof being engageable with the sprinkler head in self-centering manner, and
  (b) means for mounting the concave centering member axially within the cutting cylinder with restricted relative axial movement therebetween.

9. The device of claim 8 wherein the concave centering member rotationally is substantially independent of the cutting cylinder.

* * * * *